United States Patent [19]

Mizuno et al.

[11] Patent Number: 5,113,183
[45] Date of Patent: May 12, 1992

[54] REMOTE CODE TRANSMISSION SYSTEM BETWEEN A NAMEPLATE APPARATUS AND A DATA PROCESSING APPARATUS

[75] Inventors: Yutaka Mizuno, Higashiyamato; Hanzo Tsuzuki, Oome; Kazuyoshi Haruhara, Fussa; Shigeki Miyata, Oome; Katsuhiko Motoike; Tooru Sakai, both of Fussa; Kazuhiro Ooishi, Akishima, all of Japan

[73] Assignee: Casio Computer Co., Ltd., Tokyo, Japan

[21] Appl. No.: 609,115

[22] Filed: Oct. 31, 1990

Related U.S. Application Data

[63] Continuation of Ser. No. 371,649, Jun. 21, 1989, abandoned, which is a continuation of Ser. No. 204,623, Jun. 9, 1988, abandoned.

[30] Foreign Application Priority Data

Jun. 16, 1987 [JP] Japan ............... 62-147995
Jun. 16, 1987 [JP] Japan ............... 62-147996

[51] Int. Cl.⁵ ................. G07G 1/00; G06C 7/00
[52] U.S. Cl. ............... 340/825.31; 340/825.34; 340/825.35; 235/382; 235/7 R; 364/404; 364/405
[58] Field of Search ........ 340/825, 31, 825.3, 340/825.33, 825.34, 825.35, 825.69, 825.72; 235/7 R, 12, 15, 375, 382; 364/401, 404, 405, 918.5

[56] References Cited

U.S. PATENT DOCUMENTS

| 3,916,386 | 10/1975 | Teixeira et al. ............ 235/472 |
| 4,003,030 | 1/1977 | Takagi et al. |
| 4,186,439 | 1/1980 | Shimura et al. |
| 4,194,176 | 3/1980 | Fukuma ............ 340/825.35 |
| 4,223,830 | 9/1980 | Walton ............ 340/825.34 |
| 4,231,511 | 11/1980 | Campanella et al. |
| 4,236,068 | 11/1980 | Walton ............ 340/825.34 |
| 4,353,064 | 10/1987 | Stamm ............ 340/825.31 |
| 4,354,189 | 10/1982 | Lemelson ............ 340/825.33 |
| 4,384,288 | 5/1983 | Walton ............ 340/825.34 |
| 4,396,985 | 8/1983 | Ohara ............ 364/405 |
| 4,453,161 | 6/1984 | Lemelson ............ 340/825.31 |
| 4,509,093 | 4/1985 | Stellberger ............ 340/825.31 |
| 4,570,223 | 2/1986 | Yoshimoto ............ 340/825.31 |
| 4,573,046 | 2/1986 | Pinnow ............ 348/825.31 |
| 4,575,621 | 3/1986 | Dreifus ............ 235/380 |
| 4,598,275 | 7/1986 | Ross et al. ............ 340/825.31 |
| 4,626,990 | 12/1986 | Komai et al. ............ 364/405 |
| 4,628,452 | 12/1986 | Shiono et al. ............ 364/405 |
| 4,663,625 | 5/1987 | Yewen. |
| 4,752,874 | 6/1988 | Meyers ............ 364/405 |
| 4,800,543 | 1/1989 | Lyndon et al. |
| 4,822,990 | 4/1989 | Tamada et al. ............ 235/380 |
| 4,837,559 | 6/1989 | Green, Sr. ............ 340/572 |
| 4,853,524 | 8/1989 | Yamaguchi et al. ............ 235/382 |

FOREIGN PATENT DOCUMENTS

| 0034230 | 8/1981 | European Pat. Off. |
| 0061373 | 9/1982 | European Pat. Off. ....... 340/825.31 |
| 0210963 | 2/1987 | European Pat. Off. ....... 364/405 |
| 2840980 | 4/1979 | Fed. Rep. of Germany. |
| 3326718 | 2/1984 | Fed. Rep. of Germany. |
| 8602186 | 4/1986 | World Int. Prop. O. ....... 340/825.34 |

Primary Examiner—Donald J. Yusko
Assistant Examiner—Peter Steven Weissman
Attorney, Agent, or Firm—Frishauf, Holtz, Goodman & Woodward

[57] ABSTRACT

In a nameplate apparatus incorporating a communication unit therein, the communication unit is formed in a thin film shape and transmits a coded code specific to the nameplate apparatus. On a front surface of this thin-film shaped communication unit, a display plate is mounted so as to display information such as a name, whereas on a rear surface of the communication unit, a holding member is provided so as to detachably secure the communication unit to a user's clothing or the like. In a data processing apparatus, after the coded code transmitted from the communication unit is determined to be coincident with a predetermined identification code, the data processing apparatus is brought into an operable condition.

7 Claims, 9 Drawing Sheets

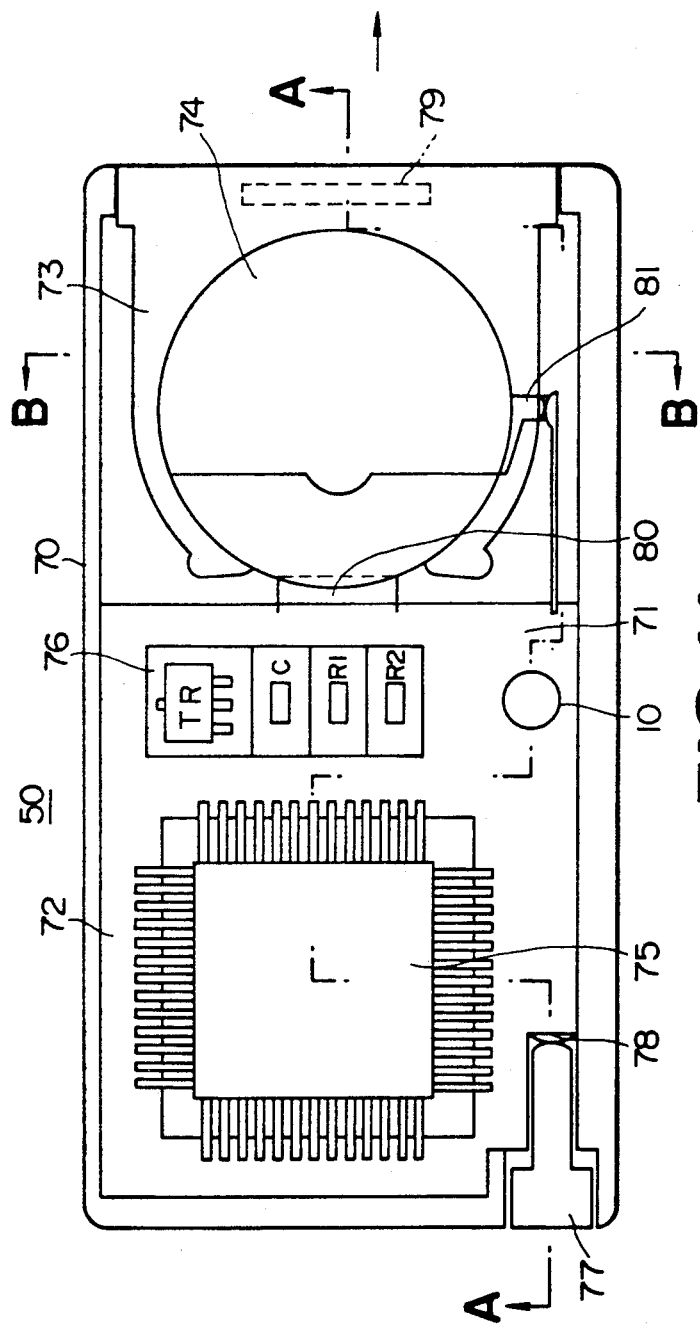
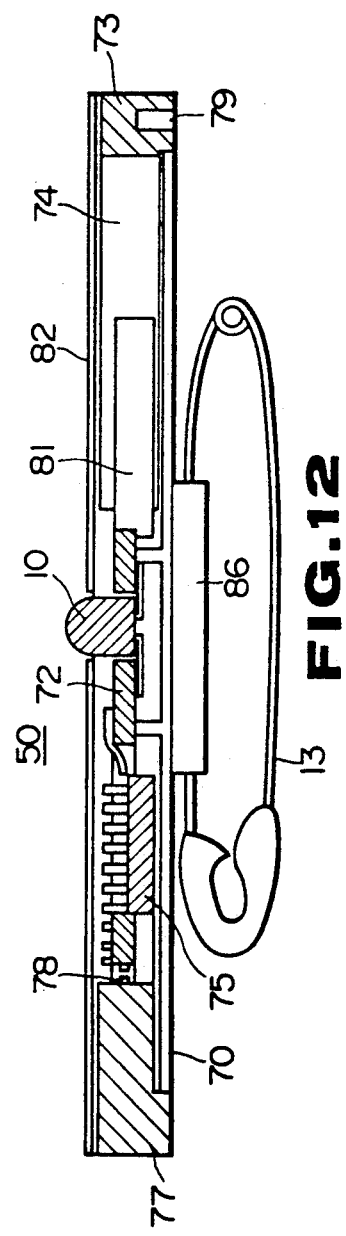
FIG.11
FIG.12

REMOTE CODE TRANSMISSION SYSTEM BETWEEN A NAMEPLATE APPARATUS AND A DATA PROCESSING APPARATUS

This application is a continuation of Ser. No. 07/371.649 filed June 21, 1989, now abandoned and which is a continuation of Ser. No. 07/204,623 filed June 9, 1988, now abandoned.

BACKGROUND OF THE INVENTION

Field of the Invention and Related Art

The present invention relates to a nameplate apparatus incorporating a communication unit.

In general, a nameplate for displaying a name and the like, which is detachably mounted on an individual in a firm or company, is formed in a rectangular thin film. The front surface of the nameplate body, has a portion into which a piece of paper can be inserted, and a name or the like is written on the piece of paper. A holding member by which the nameplate body is installed on a wearer, is mounted on a rear surface of the nameplate body. Then, such nameplates are distributed to, for instance, either staff members of a department store and a supermarket, or attendants of a party. To announce a name of an individual to others, the nameplate is usually mounted on his breast pocket.

However, such a conventional nameplate has only a limited function. That is to say, only the name of the nameplate holder and the name of the department to which this nameplate holder belongs can be merely recognized by observing the indications written on the nameplate by other persons. Accordingly, the conventional nameplate has a very narrow use.

In, on the other hand, an electronic cash register (referred to as an "ECR") since sales data entered into the ECR is totalized based upon each of staff members who has entered the sales data, an identification code allocated to a staff member must be input into the ECR before commencement of the input operation of the sales data. Two typical methods to enter the identification code into an ECR have been proposed. According to one conventional entering method, as described in U.S. Pat. No. 4,003,030, the numerical keys of the keyboard are operated to enter the staff members own identification code into the ECR. In the other conventional entering method, as described in U.S. Pat. No. 4,186,439, the identification code is entered into the ECR by manipulating one switch allocated to the specific staff member among a plurality of staff member switches provided on the keyboard.

However, a staff member must perform cumbersome key operations in any conventional code entry methods, which gives a heavy load on the staff. Moreover, a staff member sometimes forgets or mistakenly performs the code entering operation, so that the sales totalization for each staff member cannot be correctly realized.

OBJECT AND SUMMARY OF THE INVENTION

An object of the present invention is to provide a nameplate apparatus wherein a thin-film-shaped communication device for transmitting an individual coding code is built therein. Accordingly, various sorts of uses other than the inherent use for a nameplate can be achieved and wider use of the nameplate apparatus can be expected.

The nameplate apparatus according to the invention includes a thin-film-shaped communication unit built therein. This built-in type communication unit comprises a battery power supply, a transmitter circuit to which a supply voltage from the battery power supply is applied, and a transmitter element driven by the transmitter circuit. For instance, the individual coded code for the nameplate holder may be transmitted as an optical signal such as infrared radiation. It should be noted that the communication unit may transmit not only an optical signal, but also an electromagnetic wave, or an ultrasonic wave. Also, the communication unit may be equipped with a receiving element and a receiver circuit.

A display plate is provided on a front surface of this thin-film-shaped communication unit. This display plate may be constructed of paper, synthetic resin or the like on which a name has been written, or of an electronic-optical display device such as a liquid crystal device. When the display plate is constructed of a dot-matrix type liquid crystal display device, the information of the name or the like which has been received by the above-described receiving element and receiver circuit can be displayed on the display screen of the liquid crystal device.

It should be understood that the "name" described in the present specification implies: a character of a personal name, a group name, or a firm name; a numerial value such as a staff number; a photograph of a staff members face; and information made by combining these data.

Also, a holding member is mounted on a rear surface of the above-described communication unit. Any sort of holding member may be utilized if the nameplate can be surely engaged on a breast pocket of a nameplate user. A simpler holding function of the holding member is preferable.

Another object of the present invention is to provide a combination system wherein an input operation of a data processing unit is validated after coincidence is established between a coded code transmitted from a portable compact communication unit such as the abovedescribed nameplate apparatus to the data processing unit, and one of the identification codes stored in the data processing unit. As a result, no key entering operation of the staff member code and the like is required, and the coded code can be surely entered.

Any portable compact unit may be utilized as the communication unit according to the invention which is operated in conjunction with the data processing unit. For instance, the communication unit may be a nameplate apparatus where the compact communication unit is built in a nameplate which is detachably mounted on an operator's body. The coded code specified to a staff member is automatically transmitted from this nameplate apparatus by way of an optical signal such as infrared radiation. The nameplate apparatus repeatedly transmits a specifically coded code and the data processing apparatus repeatedly detects the presence of the received coded code transmitted from said nameplate apparatus.

When the operator having on his body such a communication unit comes close to the data processing unit such as an ECR in order to operate the key entry (or key input), a receiver unit provided within the data processing unit will immediately receive the coded code automatically transmitted from the communication unit. Then, a check is made as to whether or not the transmitted coded code corresponds to the identification code allocated to this staff member who is permitted to perform the key entry operation. As a result of this checking operation, when the transmitted code corresponds to the identification code previously allocated to the staff member, the data processing unit can perform the data processing in response to an input instruction supplied from an input device. The data indicating the coincidence coded code is stored in a memory, so that the operator operating the data processing apparatus can make sure of the staff member's identity. Conversely, when the transmitted code does not correspond to the identification code, the data processing unit invalidates the input instruction supplied from the input device. As previously described above, the coded code which is automatically transmitted from the external communication unit, is received and recognized in the data processing unit according to the invention, so that no longer must an operator input his own identification code, but the identification code is automatically and surely entered When an operator wearing said nameplate apparatus moves from the front of the data processing apparatus to another place, the data processing apparatus cannot receive the coded code repeatedly transmitted from the nameplate apparatus. Then, the data processing apparatus invalidates a key entry. As a result, it can prevent another person having no nameplate apparatus from operating the data processing apparatus.

BRIEF DESCRIPTION OF THE DRAWINGS

FIGS. 10 through 13 illustrate a nameplate apparatus according to a third preferred embodiment of the invention; FIG. 10 being a front view of the nameplate apparatus to FIG. 11 being an internal component arrangement thereof, FIG. 12 being a sectional view taken along line A—A of FIG. 11, and FIG. 13 being a sectional view taken along line B—B of FIG. 11.

DETAILED DESCRIPTION OF THE PREFERRED EMBODIMENTS

General Description of Nameplate Apparatus

Figure 1:
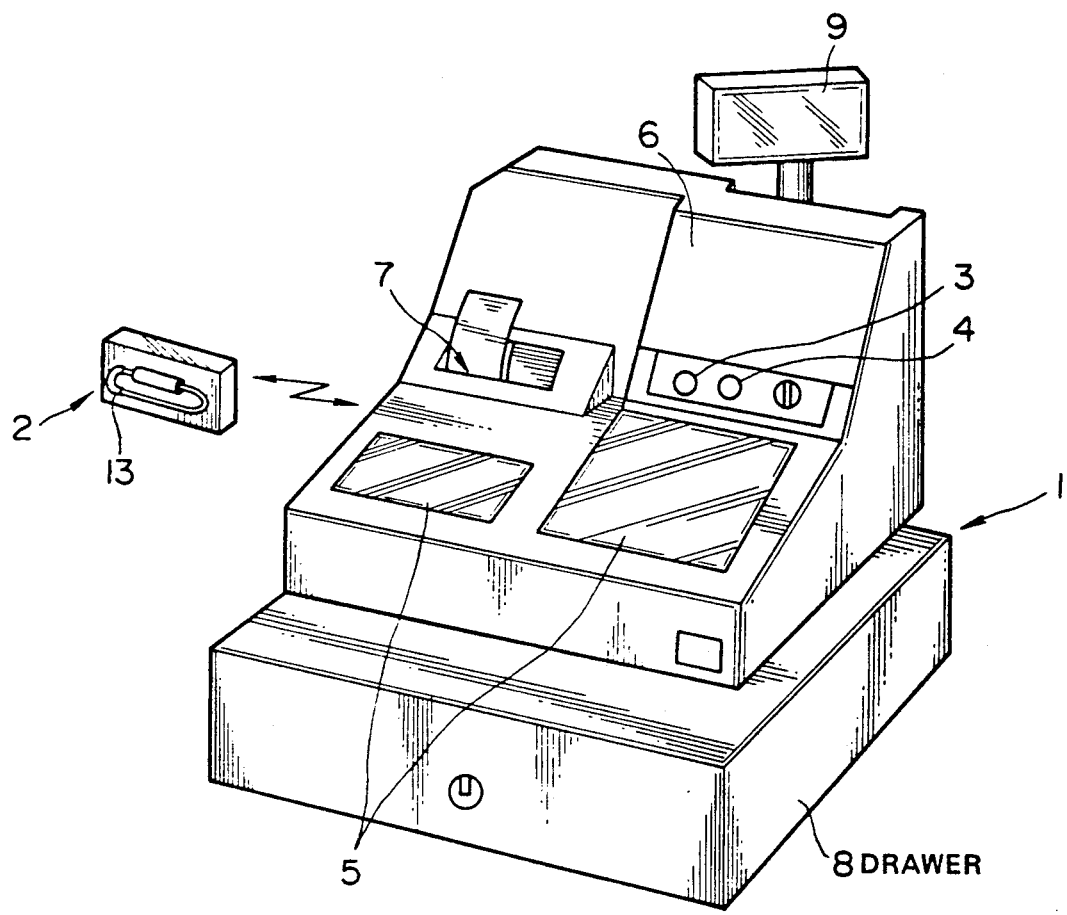
FIG. 1 is a perspective view of an electronic cash register and a nameplate apparatus according to the invention.

Referring now to FIG. 1, a general description of a nameplate apparatus according to a first preferred embodiment of the invention will be made. In the preferred embodiment, utilizing an optical signal (infrared radiation) as a signal transmitting medium, signal transmission and reception are performed between an electronic cash register (referred to as an "ECR") 1 and a nameplate apparatus 2. That is, a communication unit is built in the nameplate apparatus, generally socalled "a nameplate", and an identification code specific to an individual staff member, i.e., a staff member code is automatically transmitted from this communication unit. When one staff member having on his body the nameplate apparatus 2 in which the above-described communication unit has been built, comes close to a front surface of ECR 1, the staff member code transmitted from the nameplate apparatus 2 is received by a photodiode 3 provided on the front surface of ECR 1. As a consequence, ECR 1 will detect whether or not this received staff member code is coincident with the staff member code which has been previously set. As a result of this detection, the register operation by this staff member is allowed when both staff member codes are coincident with each other. Also, a light emitting diode 4 for transmitting an optical signal toward the nameplate apparatus 2 is installed on the front surface of ECR 1. Accordingly, the optical-signal transmission and reception can be performed between ECR 1 and the nameplate apparatus 2 in a bidirectional manner.

It should be understood that this ECR 1 is, of course, equipped with a keyboard 5, a display panel 6, a printer 7, a drawer 8, a rotating display device 9 and so on.

Figure 2:
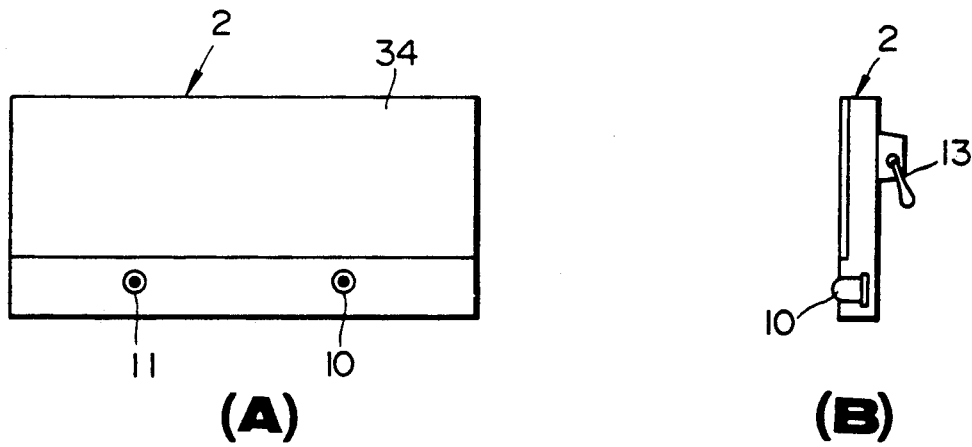
FIG. 2A is a front view of the nameplate apparatus illustrated in FIG. 1.
FIG. 2B is a side view of the nameplate apparatus.

FIG. 2 shows an outer appearance of the nameplate apparatus 2. As illustrated in FIG. 2A, a transmitter unit 10 and a receiver unit 11 are provided on the front surface of the nameplate apparatus. Moreover, a dot-matrix type liquid crystal display unit 12 constituting the nameplate is provided thereon. As shown in FIG. 2B, a holding member 13 is provided on a rear surface of the nameplate apparatus 2.

Circuit Diagram of ECR

Figure 3:
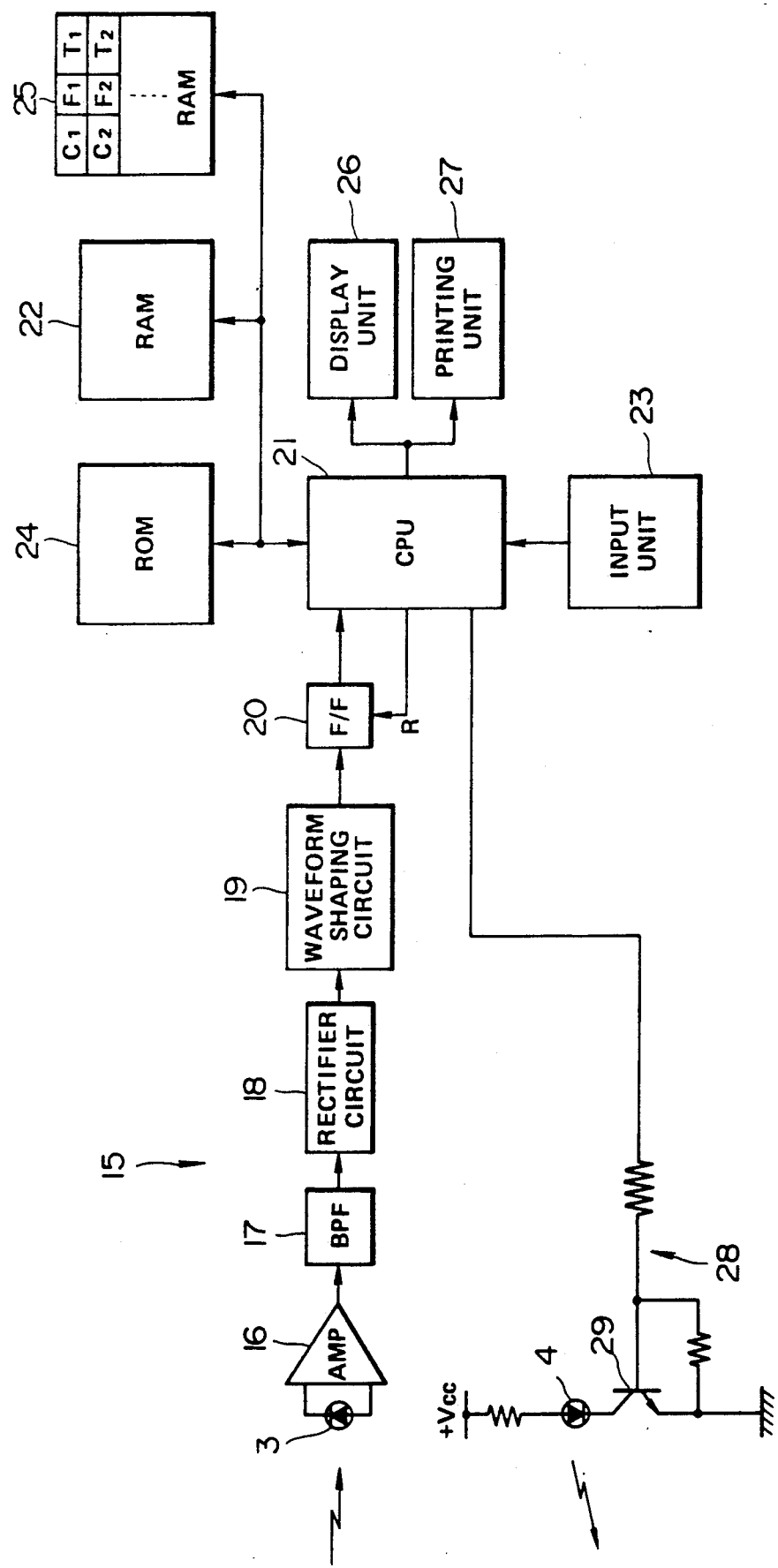
FIG. 3 is a schematic block diagram of the circuit of the electronic cash register shown in FIG. 1.

Referring now to a circuit block diagram of FIG. 3, the circuitry of ECR 1 will be described.

A photodiode 3 constituting a receiver unit 15 receives a pulse-type optical signal produced by turning ON/OFF a light emitting diode of the nameplate apparatus 2 in accordance with the staff member code, and converts this optical signal, i.e., the optical signal spatially transmitted from the nameplate apparatus 2, into a corresponding electronic signal. In this case, since an interfering light component is mixed with this electronic signal, an adverse influence by the interfering light component is eliminated by employing a bandpass filter 17 after the electronic signal is amplified in an amplifier 16 in order to derive therefrom only the electronic signal corresponding to the optical signal transmitted from the nameplate apparatus 2. Then, an output from the bandpass filter 17 is supplied via a rectifier circuit 18 to a waveform shaping circuit 19. As a result, a pulse signal having a binary level thus obtained, enables a flip-flop 20 to be set by its rising edge. The flip-flop 20 is employed so as to identify the pulse signal derived from the waveform shaping circuit 19. A central processing unit 21 (referred to as a "CPU") performs its identification process by way of a coding operation. That is, using an identifying RAM (random access memory) 22, CPU 21 counts a time period from the first set of the flip-flop 20 till the subsequent set thereof. An output from the flip-flop 20 is sent to CPU 21, and the flip-flop 20 is reset by receiving a reset signal "R" output from CPU 21.

CPU 21 will then detect whether or not the staff member code which has been identified as described above, is coincident with another staff member code which has been previously set in a totalizer 25 which includes a RAM (random access memory) (will be discussed later). CPU 21 controls to permit the register operation by the above-described staff member in accordance with the detection result. It should be noted that an input unit 23, a ROM (read only memory) 24, a totalizer 25, a display unit 26 and a printing unit 27 which are normally provided in an ECR, are connected to CPU 21. The totalizer 25 comprises a RAM, and has a totalizer for a department, and a totalizer for a staff member in the memory regions thereof. In the memory region constituting the totalizer for a staff member, staff flags $F_1$, $F_2$,—$F_n$ ("n" being an integer) have been stored which represent the staff members under identification in accordance with individual staff member codes $C_1$, $C_2$,—$C_n$ ("n" being also an integer). It should be noted that in the totalizer 25, there are provided totalizers $T_1$, $T_2$,—$T_n$ ("n" being an integer) in accordance with the above-described individual staff member codes $C_1$, $C_2$,—$C_n$.

The transmitter unit 28 comprises a light emitting diode (LED) 4 and an NPN transistor 29 for driving the light emitting diode. It is well known that the ON/OFF operation of the NPN transistor 29 is controlled under the control of CPU 21.

Circuit Arrangement of Nameplate Apparatus

Figure 4:
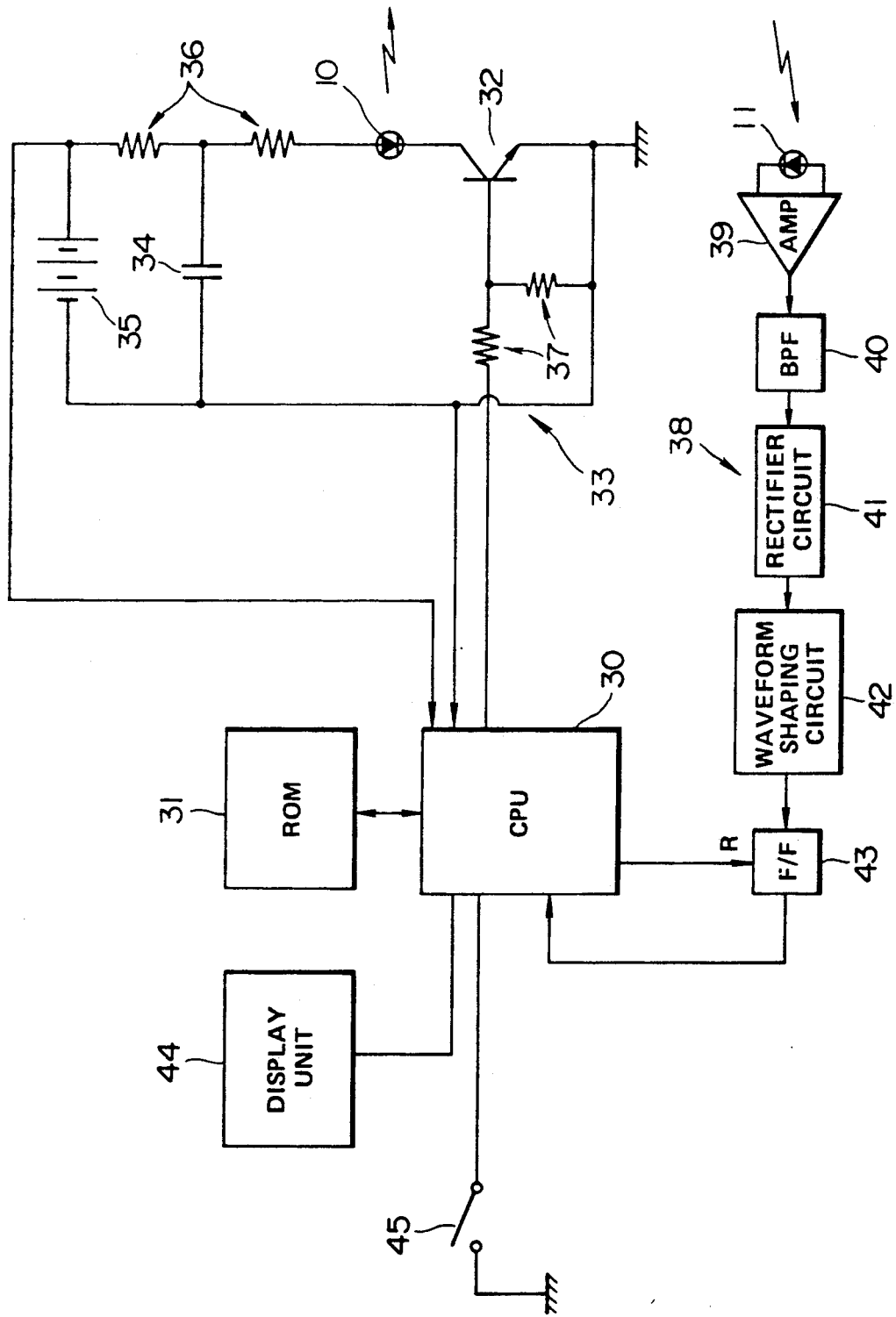
FIG. 4 is a schematic block diagram of the circuit of the nameplate apparatus illustrated in FIGS. 1, 2A and 2B.

Referring to FIG. 4, the circuit diagram of the nameplate apparatus 2 will be described. The nameplate apparatus 2 mainly comprises a central processing unit 30 (referred to as a "CPU"), and outputs an optical signal in accordance with the staff member code from the transmitter unit 33. In this case, CPU 30 intermittently produces a binary-level signal (i.e., ON/OFF signals) representative of the staff member code which has been previously stored in ROM 31 at a predetermined interval. Then, CPU 30 controls the ON/OFF operations of the NPN transistor 32 constituting a LED driving circuit to turn ON/OFF the light emitting diode (LED) 10. Accordingly, an optical signal corresponding to the staff member code is intermittently generated from LED 10 at a predetermined time interval.

In the previous embodiment, the staff member code is stored in ROM 31. It is of course possible to store the staff member code in a RAM (random access memory) newly employed. Moreover, a plurality of switches are employed and the specifically coded code may be produced by combining the ON/OFF operations of these switches.

It should be noted that a capacitor 34 having a large capacity is connected in parallel to a battery 35 in order to reduce the power consumption of the transmitter unit 33 in the preferred embodiment. That is, in general, a large turn-on current flows through a power supply when a light emitting diode 10 is turned on, so that a life time of the battery is shortened. In the preferred embodiment, to avoid such a drawback, this large turn-on current can flow through the capacitor 34 by parallel-connecting the capacitor 34 to the battery 35. In this case, although the supply voltage from the battery 35 is charged to the capacitor 34, this charging operation is carried out during one time interval. While the transistor 32 is turned ON, its voltage is reduced due to the fact that LED 10 is driven. However, the voltage can be recovered by the charging operation during the subsequent time interval. Reference numerals 36 and 37 denote resistors.

Also, a receiver unit 38 is employed in the nameplate apparatus 2. The circuit arrangement of this receiver unit 38 is similar to that of the receiver unit 15 of ECR 1. That comprises, the receiver unit 38 is a photodiode 11, an amplifier 39, a bandpass filter 40, a rectifier circuit 41, a waveform shaping circuit 42 and a flip-flop 43.

A dot-matrix type liquid crystal display unit 44 is employed in the nameplate apparatus 1.

Since an operation signal of a reset switch is input to CPU 30, the display content of the liquid crystal display unit 44 is erased and the data contained in CPU 30 is initialized by operating this reset switch 45.

Transmiting/Receiving Coded Optical Signal

Referring now to waveforms and a flowchart of FIGS. 5 and 6, transmission and reception of the coded optical signal will be described.

An optical signal transmitted from the nameplate apparatus 2 is first coded in the following coding method and thereafter transmitted to ECR 1. That is, as illustrated in FIG. 5, a time ratio of a turn-on time period of LED 10 (ON-time) to a turn-off time period (OFF-time) thereof is selected to 1:1 for this optical signal. This optical signal can represent a binary "0", whereas a binary "1" signal is represented by the time ratio of 1:3. One set of a transmission code comprises constructed of a start bit corresponding to the signal, a subsequent data bit formed by combining "0" with "1" signals, and a stop bit. In this case, the data bit is comprised of 3 bits, and therefore one complete transmission code is comprised of 5 bits. The data bit is transmitted from its least significant bit (LSB).

When the coded optical signal is transmitted to ECR 1, the received code is identified in the ECR end. That is, CPU 21 performs the identification process of the received code in accordance with a flowchart shown in FIG. 6 when CPU 21 is powered.

Figure 6:
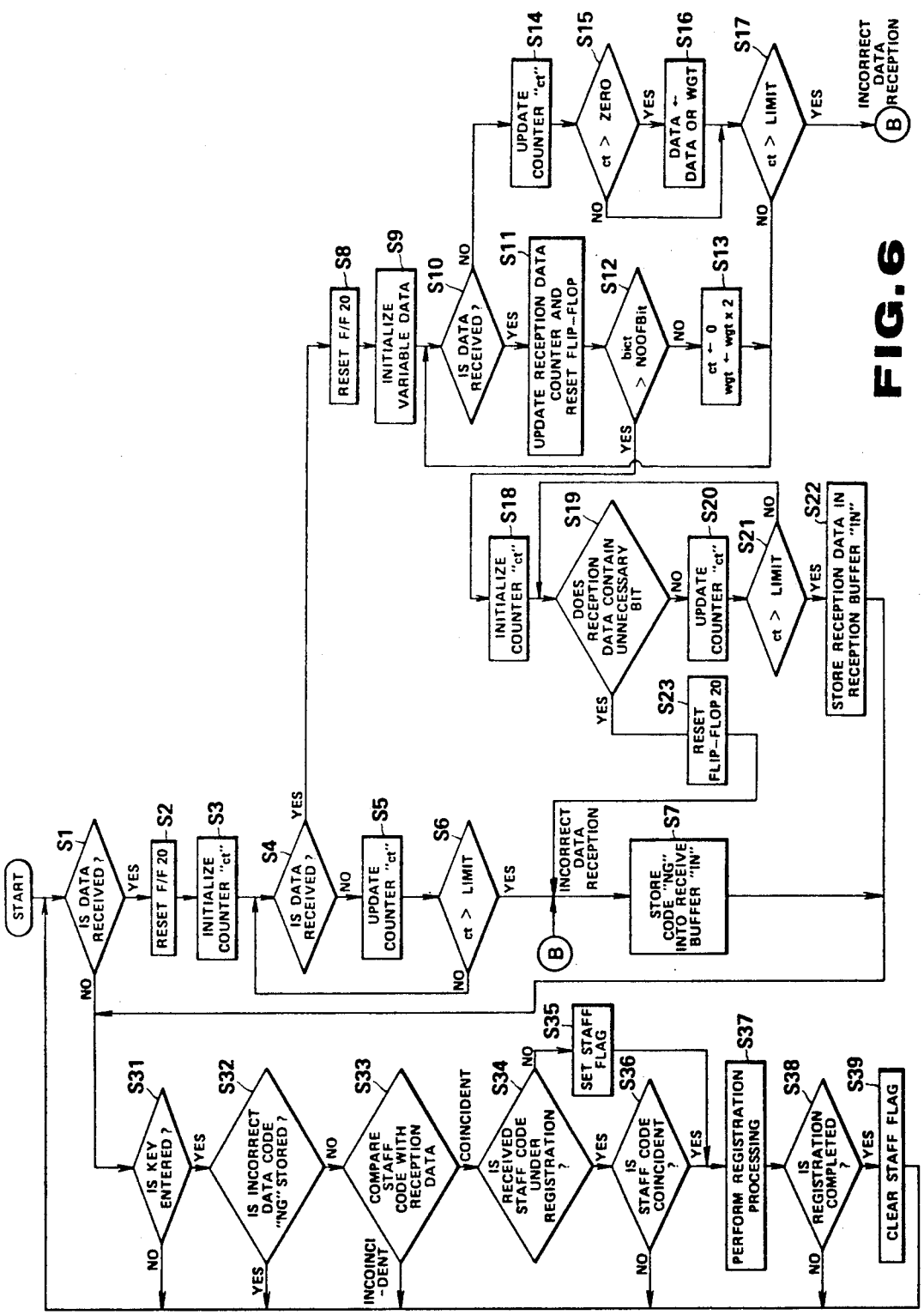
FIG. 6 is a flowchart for explaining an identifying process of the coding codes.

In the flowchart of FIG. 6, a check is made for the content of the flip-flop 20 so as to detect the start bit of the coded optical signal (step S1). As a result of this check, when the start bit is received, the flip-flop 20 is reset (step S2). Thereafter, a work counter "ct" is initialized (step S3). It should be noted that this work counter "ct" is employed so as to measure a receiving time period, and is provided within the identifying RAM 22.

Thereafter, a check is made whether or not the first data bit (LSB) among the 3-bit data has been received in accordance with whether the flipflop 20 is set or not (step S4). In this case where the start bit is now transmitted, a check is made whether or not this start bit is normally received while awaiting the reception of the first data bit. In other words, the counter value of the work counter "ct" is updated (step S5), and a check is made whether or not this updated value exceeds a previously set LIMIT time (step S6). It should be noted that the third LIMIT time exceeds a time representative of, for instance, a "1" signal of the data bit (i.e., the longest data bit signal), and is previously set in the identifying RAM 22. Then, when the counter value of the work counter "ct" exceeds the LIMIT time, it can be regarded that incorrect data is received. An incorrect data code NG is stored in the receiver buffer IN within the identifying RAM 22 (step S7).

Since upon receipt of the first data bit, the flip-flop 20 is set, it is detected in the step S4. As a result, the flipflop 20 is reset and each of variable data for code identification in the identifying RAM 22 is initialized (steps S8 and S9). In this case, the work counter "ct" is cleared, "1" is set to the receiver bit counter "bitct" so as to indicate a reception of the first data bit, and moreover, the reception data "data" is set to "0" (decimal numeral), and a weight "wgt" of the reception bit is set to "1". In the subsequent step S10, a check is made whether or not the succeeding data bit is received. Since the first data bit is received in this case, the control process is advanced to the step S14, in which the counter value of the work counter "ct" is updated and a check is made whether or not the updated value exceeds the time (ZERO) representative of a "1" signal of the data bit (step S15). In other words, an identification operation for checking that the first data bit corresponds to a "1" signal or a "0" signal is performed. Accordingly, when the updated value exceeds the ZERO time, it is recognized that the first bit data corresponds to "1". Then, a weight "wgt" of the reception bit is OR-added to the reception data "data" and the resultant data is understood as the reception data "data" (step S16). If the updated value does not exceed the ZERO time, namely if the data bit corresponds to "0", the processing step 16 is jumped. Then, the control process is advanced to the subsequent step S17 where a judgement is made whether or not the received data corresponds to be normal or not. This judgement is checked by comparing the counter value of the work counter "ct" with the LIMIT time. If the received data corresponds to the incorrect data, the control process is advanced to the above-described step S7. Conversely, if the received data corresponds to the correct data, the control process is returned to the step S10.

Figure 5:
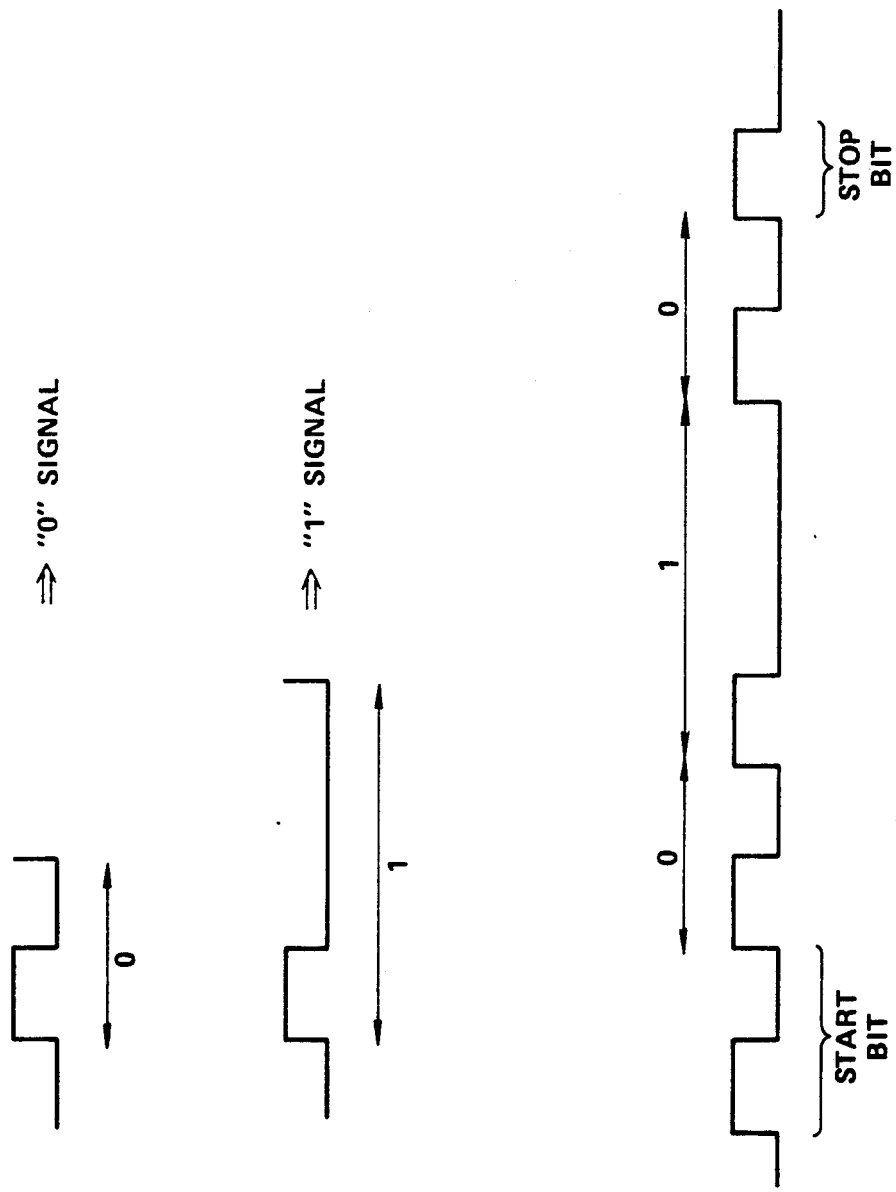
FIG. 5 illustrates signal forms for coding codes.

When the firstly received data bit corresponds to the "0" signal as illustrated in FIG. 5, the subsequent data bit is received before the counter value of the work counter "ct" exceeds the ZERO time. As a consequence, the control process is advanced to the step S11 at which the counter value of the reception bit counter "bitct" is updated and the flip-flop 20 is reset. Then, a check is made whether or not the counter value of this reception bit counter "bitct" exceeds a data bit number "NOOF bit" previously set (step S12). Since, at this stage, the counter value of the reception bit counter "bitct" corresponds to "2" and also the data bit number "NOOF bit" corresponds to "3", the control process is advanced to the subsequent step S13. In this step S13, the work counter "ct" is cleared and the weight data is updated by multiplying the weight "wgt" of the reception bit by "2". Thereafter, the control process is returned to the previous step S10.

As illustrated in FIG. 5, since the secondly received data bit corresponds to a "1" signal, the counter value of the work counter "ct" exceeds the ZERO time until the third data bit is received, so that the control process in the step S16 is performed and the weight "wgt" of the reception bit is multiplied to the reception data "data". As a consequence, the reception data "data" becomes "2".

Then, when the last data bit is received, the counter value of the reception bit counter "bitct" is updated by "3". Also in this case, since the updated counter value does not exceed the data bit number NOOF bit, the control process is advanced to a step S13 in which the weight "wgt" of the reception bit is updated. In this case, as illustrated in FIG. 5, since the last data bit corresponds to a "0" signal, the stop bit is received before the counter value of the work counter "ct" exceeds the ZERO time. As a result, since the control process of the step S16 is not performed, the reception data "data" remains at "2". Then, as the counter value of the reception bit counter "bitct" is updated and thus becomes 4, it does exceed the data bit number NOOF bit.

When, as previously described, a predetermined bit number of data has been received, this reception is detected in a step S12. The control process is advanced to a step S18. In this step S18, the work counter "ct" is initialized. Thereafter a check is made whether or not the reception data contains an unnecessary bit (in a step S19). As a result of this check, if the unnecessary bit is contained in the reception data, it is regarded as the reception of the unnecessary data and then, the flip-flop 20 is reset at a step S23. Thereafter, the control process is advanced to the step S7. Conversely, if the unnecessary bit is not contained in the reception data, a check is made whether or not the updated counter value of the work counter "ct" exceeds the LIMIT time while the counter value of the work counter "ct" is updated in a step 20 (in a step S21). Until the counter value of the work counter "ct" exceeds this LIMIT time, the control process is brought into the waiting condition while returning to the step S19. Then, when the counter value of the work counter "ct" exceeds the LIMIT time, it can be regarded as the reception of the correct data. This reception data "data" is stored in a reception buffer "IN". Thus, the reception data which has been stored in the reception buffer "IN" represents the staff member code as in the form of decimal numeral.

As previously described in detail, the identification process of the reception code is performed every time the transfer code of 5-bit data is received from the nameplate apparatus 2 at a predetermined interval.

When the reception of the start bit is not detected at the step S1, a check is made whether or not the key is entered by the input unit 23 (a step S31), and the control process is brought into the waiting condition while returning to the step S1 until the key is entered. When a check is made that the key is entered, the content of the reception buffer "IN" is checked (a step S32). As a result of this checking operation, if the incorrect data code "NG" is stored, the control process is returned to the step S1 so as to invalidate the key entry. If the normal reception data is stored in the reception buffer "IN", the reception data stored in the reception buffer "IN" is compared with the staff code which has previously been stored in the RAM 25 (in a step S33). As a result, when non-coincidence existing in both reception data is detected, the control process is returned to the step S1 so as to invalidate the key entry. Consequently, when the staff member code which is now received does not correspond to a staff member who is previously registered and permitted to operate ECR 1, ECR 1 does not allow the key entry by this none-registered staff member.

When, on the other hand, the "coincidence" is checked in the reception data stored in the reception buffer IN and the staff member code which has been previously stored in the identification RAM 22, in other words, the key entry by the staff member who is previously permitted to operate ECR 1 is performed, another check is made whether or not the received staff member code is under registration (in a step S34). If the received staff member code is not registered, the staff member code corresponding to the data previously stored in the reception buffer IN is searched from the totalizer 25, and the staff flag which corresponds to the received staff member code among each of the staff member codes $F_1, F_2, \ldots, F_n$ (n being an integer), is set (in a step S35). As previously described, this staff member flag represents the staff who is under identification, and therefore has been set until the registration of one transaction is accomplished. After the staff flag is set in such a way, the registration processing and the like are performed in response to the key entry operation (in a step S37). In the previous step S34, when detection is made that the received staff member code is under registration, the registration processing can be performed under the condition that the previously received staff member code is equal to the presently received staff member code. In other words, to check whether or not the staff member has been changed until the registration of one transaction is accomplished, detection is made whether or not the staff flag within the totalizer 25, which corresponds to the staff member code received at this time, has been set (in a step S36). As a result, when the noncoincidence is detected since the staff is changed under registration during one transaction, the control process is returned to the step S1. Then, the key entry effected by the changed staff member is not permitted in ECR 1. Conversely, when the "coincidence" is detected in both staff member codes, the key entry effected by the staff member is valid and accordingly, the registration processing and the like are performed (in a step S37).

In this step S37, in response to an operation of a cash sales key (not shown) provided on the keyboard 5, the process of the registration is performed. During this process, the total data of a single customer is accumulated in the totalizer specified to the staff member in question among the totalizers allocated to the respective staff members within the totalizer 25 in accordance with the staff flag set in the previous step S35.

In a subsequent step S38, a check is made whether or not the registration of one transaction is completed. If the registration is not yet accomplished, the control process is returned to the previous step S1. When, conversely, the completion of the registration is checked, the control process is advanced to a next step S39, in which the staff flag within the totalizer 25 is cleared. Thereafter, the control process is returned to the step S1.

Modifications

According to the present invention, the nameplate apparatus 2 is not limited to the abovedescribed preferred embodiment. For instance, in the above-described preferred embodiment, the staff member code is transmitted from the nameplate apparatus 2. Many external appliances may be available from which such a staff member code maybe transmitted. The transmitter is built in, for example, a watch, a pen, a ring, or a necklace which is carried on a human body and from which a staff member code is transmitted. In this case, the following condition is required that the staff code is automatically transmitted from the above-described external appliance.

Also, in the preferred embodiment, the nameplate apparatus 2 is adapted to an ECR (electronic cash register). The nameplate apparatus according to the present invention may be utilized in other electronic appliances, for instance, a personal computer, a wordprocessor, an electronic copying machine, a time recorder and so on.

Similarly, not only the staff member code, but also other proper codes may be transmitted as the coded code from the external appliance.

Although the input operation for the registration processing is invalidated in the above-described preferred embodiment, other controlling methods may be apparently employed according to the invention. For instance, the staff member codes are previously stored in the apparatus, by which each of processes for registration, return, read and reset is permitted or not, and then, the input operations for the respective processes are allowed or not by comparing the received staff member code with the previously stored staff member code.

Display Operation For Staff Names

Figure 7:
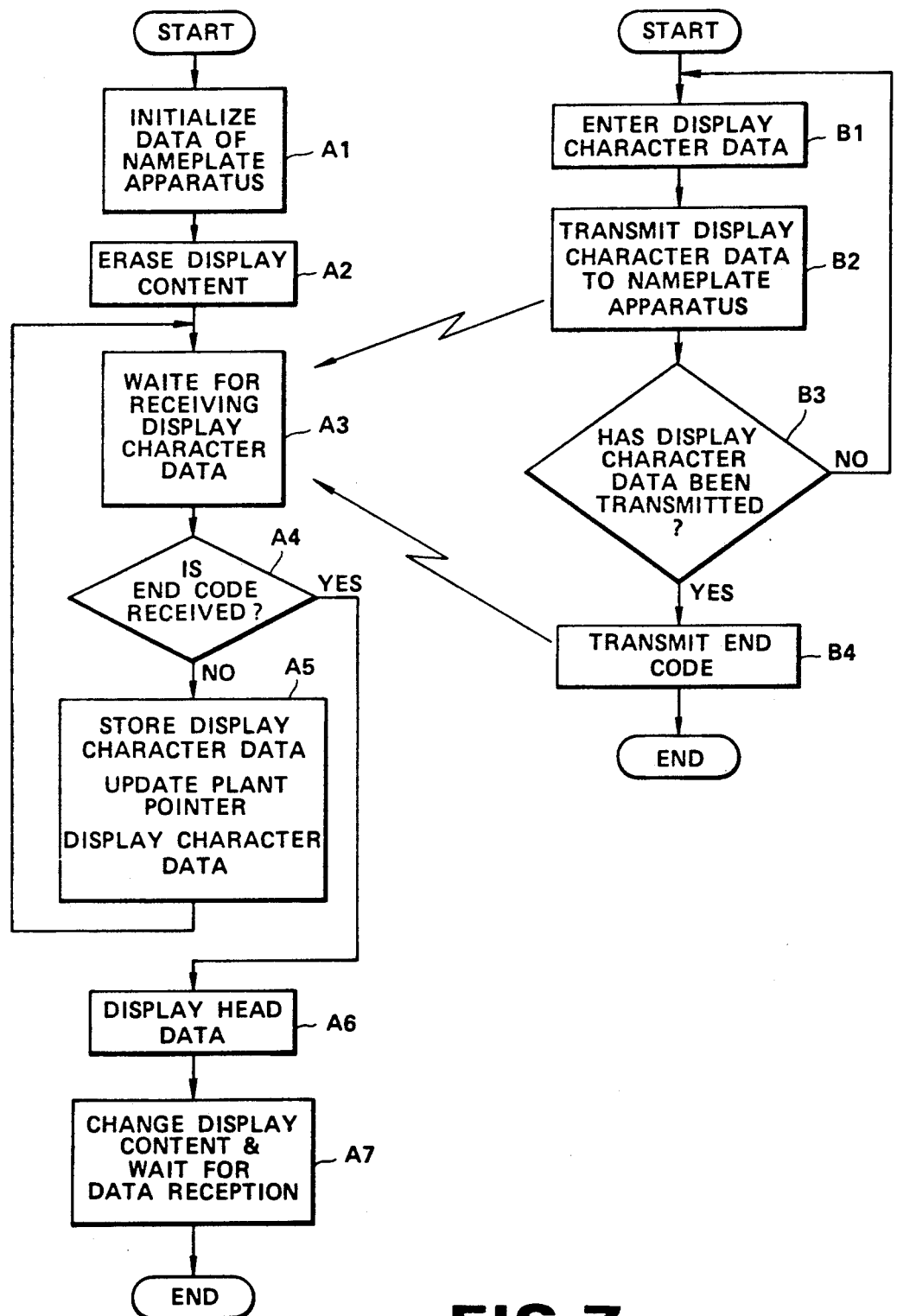
FIG. 7 is a flowchart for explaining a display data transmitting operation from the electronic cash register to the nameplate apparatus.

Referring now to a flowchart shown in FIG. 7, a description will be given of a case where the display character data such as a staff member name supplied from ECR 1 is displayed on a liquid crystal display unit 44 of the nameplate apparatus 2. In this case, an arbitrary nameplate apparatus among a plurality of nameplate apparatus 2 which are previously prepared for the respective staff members, is selected and held by the staff member in charge by his hand in such a manner that the front surface of the arbitrary nameplate apparatus is positioned opposite to the front surface of ECR 1. The reset switch 45 mounted on this nameplate apparatus 2 is operated (see FIG. 4). Then, the data or the like internally stored in this nameplate apparatus 2 is initialized in a step A1, and thereafter the display content of the liquid crystal display unit 44 is erased in a step A2. Subsequently, the nameplate apparatus 2 waits for receiving the display character data which will be transmitted from ECR 1 in a step A3.

On the other hand, in ECR 1, a specific key is operated so as to designate a setting mode of the display character data. At first, ECR 1 is brought into the condition capable of entering the display character data which is transmitted to the nameplate apparatus 2 in a step B1. When a plurality of display character data for each of the staff members are entered at one time, the display character data entered into ECR 1 are successively written into RAM 22. A plurality of display character data which have been written into RAM 22 with respect to each of the staff members, are sequentially read out therefrom, and then sequentially transmitted from the transmitter unit 4 to the nameplate apparatus 2 in a step B2. When the transmission of all of the display character data which have been stored in RAM 22 is completed in a step B3, ECR 1 transmits an end code to the nameplate apparatus 2 so as to report the end of the data transmission in a step B4.

Upon receipt of either the display character data, or the end code transmitted from ECR 1 under the above-described transmission conditions, the nameplate apparatus 2 will first check whether or not the reception data corresponds to the end code in a step A4. If it corresponds to the display character data, the reception data is stored in the reception memory provided within CPU 30, and the plant pointer for this reception memory is undated and moreover, the display of the reception data is performed in a step A5. Thereafter, the control process is returned to the previous step A3 so as to wait for the subsequent data transmission. With this operation, the display character data transmitted from ECR 1 are successively stored in the reception memory. Thereafter, when the end code is received, the specific display character data (i.e., the first received data) which have been stored in the head region of the reception memory, are temporarily displayed on the liquid crystal display unit 44 in a step A6, and the nameplate apparatus 2 waits for receiving the display command data to be transmitted from ECR 1 in a step A7.

In the preferred embodiment, the display command data is transmitted from ECR 1 in such a way that the specific numeral data corresponding to the character data to be displayed on the nameplate apparatus 2, is transmitted as the readout address for the above-described reception memory. Then, the nameplate apparatus 2 reads out the specific character data from the display character data which have been stored in the above-described reception memory with respective to the numeral data, and displays them on the liquid crystal display unit 44. As a result, the display content of the liquid crystal display unit 44 is consolidated and thus, the data specified for the staff member in charge is displayed.

As previously described above, in the nameplate apparatus 2 according to the preferred embodiment, the display character data transmitted from ECR 1 can be received and displayed on the liquid crystal display unit 44. As a consequence, even if the display contents are changed, it is not necessary to change the nameplate, but merely to change the display content of the liquid crystal display unit 44. It should be noted that various data other than the display character data may be displayed on the liquid crystal display unit 44, and furthermore, the staff member code is transmitted from ECR 1 and received by the above-described reception unit 38 so as to be automatically set in the nameplate apparatus.

Nameplate Apparatus Having Holder/Power Switch

Figure 8:
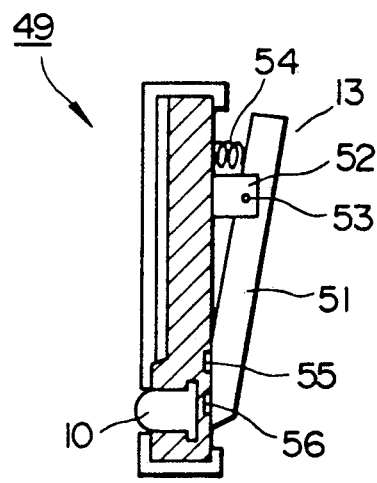
FIG. 8 is a cross-sectional view of a nameplate apparatus according to a second preferred embodiment of the invention.

Referring now to FIG. 8, other nameplate apparatuses 49 according to the invention will be described. The nameplate apparatuses 49 each include a holding member 13 which can function as a power switch for the nameplate apparatus 49. It should be noted that in the preferred embodiment that the nameplate apparatuses 49 do not contain the receiver unit. That is, as illustrated in FIG. 8, the holding member 13 mounted on the rear surface of the nameplate apparatus 49, is pivotally journaled on a pin 53. A metal plate 51 is fixed on a rear surface of the nameplate apparatus 49, and a tip portion of the metal plate 51 is continuously depressed onto the rear surface of the nameplate apparatus 49 by receiving a resilient force exerted by a coil spring 54. Then, a pair of electrode plates 55 and 6 are provided on a portion of the rear surface of the nameplate apparatus 49 where the tip portion of the metal plate 51 is depressed by the coil spring 54. A light emitting diode 10 is mounted on a front surface of the nameplate apparatus 49.

Circuit Arrangement of Nameplate Apparatus Having Holder/Power Switch

A circuit arrangement of the nameplate apparatus 9 shown in FIG. 9 will now be described with reference to FIG. 8. The nameplate apparatus 49 comprises a light emitting diode (LED) 10, an LSI (large-scale integration) device 61 containing a CPU and other circuit arrangements, a battery 62, an NPN transistor 63 for driving the LED 10, and an NPN transistor 64 for controlling a power supply. A positive polarity terminal of the battery 62 is connected via a current limiting resistor R1 to a Vcc input terminal of LSI 61 and a collector of the NPN transistor 64, and furthermore via another current limiting resistor R2 to an anode of the light emitting diode 10. Then, a negative polarity terminal of the battery 62 is connected to each of emitters of the NPN transistors 63 and 64, and also to a GNP input terminal of LSI 61. The transistor 63 is turned ON/OFF by receiving through its base electrode, the staff member code (i.e., a bi-level signal) output from LSI 61 via a current limiting resistor R3. Accordingly, this transistor 63 controls the light emission of the light emitting diode 10. Another transistor 64 is connected between the Vcc input terminal of LSI 61 and the GND input terminal thereof, and has a base electrode to which the electrode plates 56 are connected via a current limiting resistor R4. When one electrode 55 connected to the positive polarity side of the battery 62 is electrically connected to the other electrode 56 by means of the metal plate 51 of the holding member 13, the NPN transistor 64 is turned ON by receiving the battery voltage so that a shortcircuit is made between the Vcc input terminal of LSI 61 and the GND input terminal.

Figure 9:
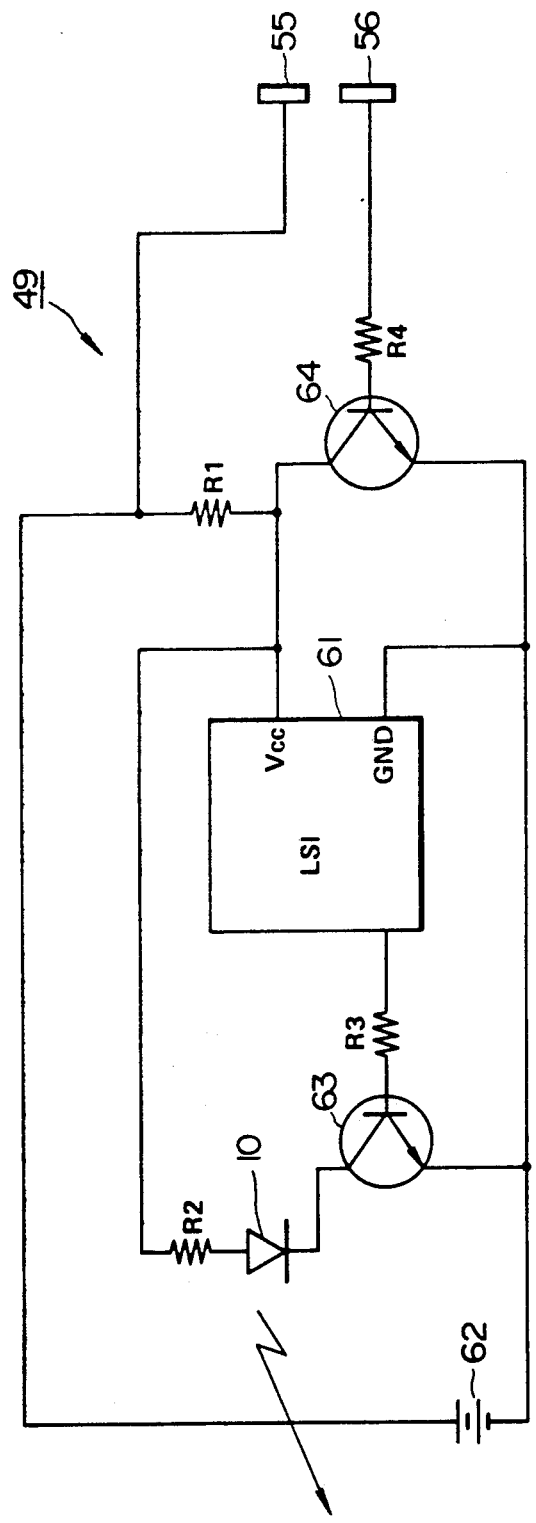
FIG. 9 is a circuit diagram of the nameplate apparatus shown in FIG. 8.

With the above-described arrangement, the nameplate apparatus 49 according to the preferred embodiment as illustrated in FIGS. 8 and 9 has a particular advantage. That is, when this nameplate apparatus 49 is not mounted on a human body of a staff member, the metal plate 51 of the holding member 13 is in contact with the respective electrode plates 55 and 56, and thus, both the electrode plates 55 and 56 are electrically connected to each other as illustrated in FIG. 8. As a result, in such a case, the transistor 64 is turned ON, and the Vcc input terminal of LSI 61 and GND input terminal thereof are shortcircuited with each other, resulting in the power off condition.

Under these conditions, when, for instance, an upper portion of a breast pocket of a staff's wear is sandwiched between the metal plate 51 of the holding member 13 and the rear surface of the nameplate apparatus 49 so as to set the nameplate apparatus 49 on the staff member's body, both the electrode plates 55 and 56 are brought into the nonconductive condition. As a result, since the transistor 64 is turned OFF, the shortcircuit condition established in LSI 61 is released and therefore the nameplate apparatus 49 is brought into the power-ON condition.

As has been described above, according to the nameplate apparatus 49 of the preferred embodiment, the power-ON/OFF conditions of the nameplate apparatus 49 can be controlled by simply mounting the nameplate apparatus 49 on the staff member's body.

In the above-described preferred embodiment, the key entry operation effected by the staff member is validated at the side of ECR 1 in response to the staff member code transmitted from the nameplate apparatus 49. However, the present invention is not limited to the above-described preferred embodiment. For instance, the staff member code may be used to confirm which ECR 1 has been utilized by the staff member in question. In this case, the entered data, or processed data contents are stored in a memory in combination with the staff member code. Moreover, the staff member codes which are received by the respective ECRs are transmitted to a center side, where these staff member codes may be utilized to confirm which ECR is used by the respective staff members, or to page the respective staffs.

In addition, according to the above-described preferred embodiment, the transmitter unit is provided on the front surface of the nameplate apparatus 49. However, the transmitter unit may be mounted on a side surface, an upper surface, and other proper surface of the nameplate apparatus 49.

Other Nameplate Apparatuses

Figure 10:
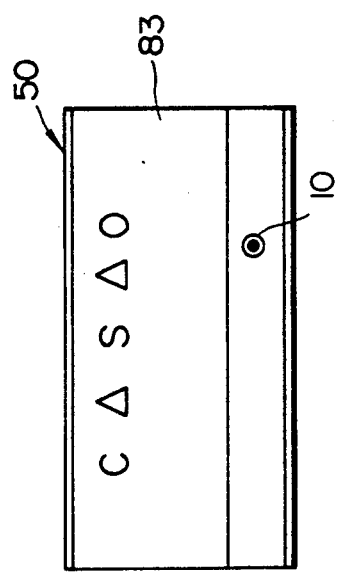

FIG. 10 shows an outer appearance of a nameplate apparatus 50. The nameplate apparatus 50 includes therein a transmitter unit from which an optical signal (infrared radiation) representative of an identification code (i.e., a staff member code) specified to an operator is transmitted from the front surface. A light emitting diode 10 on the lower portion of the front surface of e apparatus 50. Also, a nameplate a name and the like of a staff member is written is the nameplate apparatus 50.

Figure 13:
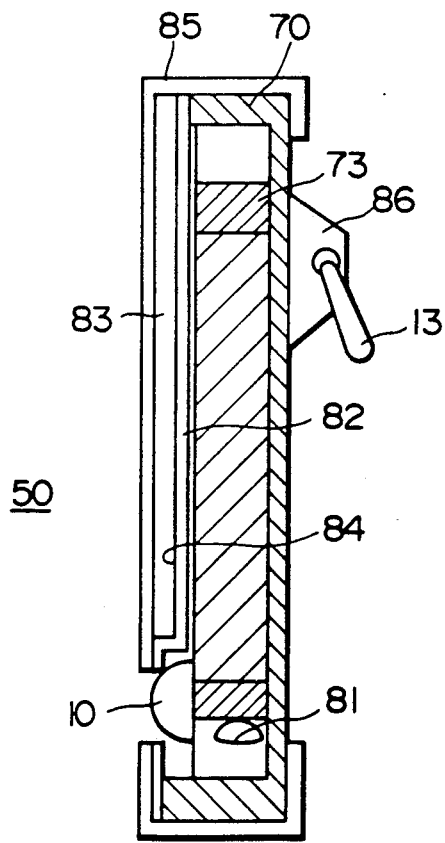

Referring now FIGS. 11 to 13, the arrangement of this nameplate apparatus 50 will be described. This nameplate apparatus 50 according to the preferred embodiment of the invention is shaped in a thin-film-like rectangular shape with a longer horizontal edge. Within a case body 70 of the nameplate apparatus 50, a transmitter unit 71 is stored.

The transmitter unit 71 includes a circuit board 72, a battery holder 73 arranged in parallel with the circuit board 72, and a battery 74 held in this battery holder 73. The entire transmitter unit 71 is formed in a thin film. A light emitting diode (LED) 10 is mounted as a transmitter element on the circuit board 72, and furthermore an LSI 75 and an LED driving circuit 76 are mounted thereon. In this case, the staff member code which has been previously stored in an internal memory of LSI 75 is converted into a driving waveform signal by the LED driving circuit 76, so that the optical signal corresponding to the desired staff member code is optically output from the light emitting diode 10. The LED driving circuit 76 comprises a transistor TR, a capacitor C, and resistors R1, R2. LSI 75 includes a CPU (central processing unit), a RAM (random access memory), an oscillator circuit, a frequency dividing circuit and so on. It should be noted that the staff member code to be stored in the internal memory of RAM's is produced as, for instance, a value corresponding to the operation number of a setting switch 77, a value generated by a random function, or the like. Reference numeral 78 represents a setting switch contact.

The battery holder 73 is a drawer type holder which can be pulled out from a case body 70 of the nameplate apparatus 50 in a direction indicated by an arrow. Accordingly, the used battery can be replaced by pulling out the battery holder 73 from the case body 70. A concave area 79 for pulling out the battery holder 73 is formed on a predetermined portion (right corner in the drawing) of a lower surface of the battery holder 73. The battery 74 is a button type battery which is in contact with a plus electrode plate 80 conducted from the circuit board 72 and also a minus electrode plate 81. This battery supplies its drive voltage to the light emitting diode 10, LSI 75, and LED driving circuit 76 provided on the circuit board 72.

The surface of the nameplate apparatus 50 having such an arrangement is covered with a hard surface cover 82. An entire shape of the surface cover 82 is a flat plate. A storing portion 84 for a nameplate 83 is provided on the surface cover 82 by forming a stepped portion. The nameplate 83 is used to write thereon a name of a staff, a name of a firm, or the like. The nameplate 83 is made of a synthetic resin, paper, and the like. The nameplate 83 is sandwiched by an outer case 85 made of a transparent synthetic resin and by the surface cover 82. The contents written on the nameplate can be observed through the outer case 85. This outer case 85 is used to cover substantially the entire portion of the nameplate apparatus 50, and is therefore inserted into the nameplate apparatus 50 by being pulled outwardly.

On a rear surface of the nameplate apparatus 50, namely, a rear surface of case body 70, a pin type holding member 13 is mounted via a fixing member 86 so as to install the nameplate apparatus 50 directly on the clothing of a nameplate holder. Since the constructions of the holding member 13 and fixing member 86 are well known in this field, no further explanation is made in the specification.

According to the nameplate apparatus 50 with the above-described construction, since the communication unit 71 comprising the battery 74, light emitting diode 10, LSI 75 and LED driving circuit 76 is formed in a thin-film shape, the communication unit 71 can be built in the nameplate apparatus 50. Also, even if the communication unit 71 is built in the nameplate apparatus 50, the size of the nameplate apparatus 50 is not large, so that the entire size of the nameplate apparatus 50 can be manufactured so as to be substantially the same size as that of the conventional nameplate apparatus.

When a staff member who takes the nameplate apparatus 50 on his body comes close to the front surface of ECR 1, the optical signal (i.e., the staff code) transmitted from the communication unit 71 is received by the receiver unit 3 of ECR 1. As a consequence, when the ECR 1 detects the coincidence established between this reception staff member code and another staff member code previously stored in ECR 1, the key entry operation by the staff member is validated by ECR 1. Accordingly, no staff-allocated switch is required in ECR 1, and the switch operation by the staff member can be omitted. Moreover, security for supervising the staff members at the ECR 1 can be considerably improved.

What is claimed is:

1. A remote code transmission system between a nameplate apparatus and an electronic cash register, for automatically controlling the cash register, comprising:
   (a) a nameplate apparatus for a staff member, including:
      a thin-film shaped communication unit built into said nameplate apparatus, and including a transmitting element; transmitter circuit means coupled to said transmitter element for continuously, and repeatedly transmitting an identification coded staff member code allocated to said staff member; and a battery powder supply for supplying power to said transmitter circuit means;
      a display plate mounted on one surface of said thin-film shaped communication unit, for displaying information on the identification coded staff member code allocated to said staff member;
      holding means mounted on another surface opposite to said one surface of said thin-film shaped communication unit and including means for holding said communication unit on the body of said staff member;
      switching means for designating an operation state of said transmitter circuit means; and
      said transmitter circuit means including means responsive to operation of said switching means for continuously and repeatedly transmitting said identification coded staff member code while said switching means designates an operation state of said transmitter circuit means; and (b) an electronic cash register, including:

input means for inputting data;

memory means for storing a plurality of different identification coded staff member codes;

receiver means for receiving the identification coded staff member code which is continuously and repeatedly transmitted from said nameplate apparatus;

detector means coupled to said receiver means and to said memory means, for detecting repeatedly whether or not a coincidence exists between the received identification coded staff member code and one of said plurality of identification coded staff member codes stored in said memory means; and processor means responsive to said input means and also responsive to said detector means, and including means for performing a data processing operation in response to an input instruction supplied from said input means only when said coincidence is detected by said detector means; means for again causing said detector means to detect whether said coincidence exists after said data processing operation has been accomplished; and means for prohibiting a data processing operation in response to a subsequent input instruction until a coincidence between the received identification coded staff member code and one of said plurality of identification coded staff member codes is detected.

2. A remote code transmission system between a nameplate apparatus and a data processing apparatus, for automatically controlling the cash register comprising:

(a) a nameplate apparatus for a staff member, including:

a thin-film shaped communication unit built into said nameplate apparatus, and including a transmitting element; transmitter circuit means coupled to said transmitting element for continuously and repeatedly transmitting an identification coded staff member code allocated to said staff member; and a battery power supply for supplying power to said transmitter circuit means;

a display plate mounted on one surface of said thin-film shaped communication unit, for displaying information on the identification coded staff member code allocated to said staff member;

holding means mounted on another surface opposite to said one surface of said thin-film shaped communication unit and including means for holding said communication unit on the body of said staff member;

switching means for designating an operation state of said transmitter circuit means; and said transmitter circuit means including means responsive to operation of said switching means for continuously and repeatedly transmitting said identification coded staff member code while said switching designates an operation state of said transmitter circuit means; and (b) data processing apparatus, including:

input means having a keyboard;

detector means for receiving and detecting repeatedly the presence of said identification coded staff member code which is continuously and repeatedly transmitted from said nameplate apparatus; and processor means responsive to said detector means and also responsive to said input means, and including means for performing a data processing operation in response to a key entry from said keyboard only after the presence of said identification coded staff member code is detected by detector means and means for again causing said detector means to detect said presence of said identification coded staff member code after said data processing operation has been performed, said processing means performing a data processing operation every time a key entry is subsequently made from said keyboard only when said presence of said identification coded staff member code is detected by said detector means for every key entry, and prohibiting a data processing operation when the presence of said identification coded staff member code is not detected by said detector means for every key entry.

3. The remote code transmission system of claim 2 wherein said holding means includes means for holding said communication unit on an article of clothing of said staff member.

4. The remote code transmission system of claim 2, wherein:

said data processing apparatus further comprises comparing means for comparing the received identification coded staff member code, detected by said detector means, with a predetermined identification coded staff member code; and said processor means of said data processing apparatus includes means for prohibiting an operation of said data processing apparatus as attempted by a staff member to whom an identification coded staff member code has been allocated when a coincidence is not detected by said comparing means, and for enabling the operation of said data processing apparatus by a staff member when a coincidence is detected by said comparing means.

5. The remote code transmission system of claim 2, wherein said information on the identification coded staff member, displayed by said display plate, comprises information on the name of the staff member.

6. The remote code transmission system of claim 2, wherein said switching means is coupled to and actuated by operation of said holding means for controlling a power ON/OFF condition of said battery power supply.

7. The remote code transmission system of claim 1, wherein said switching means is coupled to and actuated by operation of said holding means for controlling a power ON/OFF condition of said battery power supply.

* * * * *